US012597105B2

(12) United States Patent
Lu et al.

(10) Patent No.: US 12,597,105 B2
(45) Date of Patent: Apr. 7, 2026

(54) SEMANTIC-AWARE AUTO WHITE BALANCE

(71) Applicant: ADOBE INC., San Jose, CA (US)

(72) Inventors: Xin Lu, Saratoga, CA (US); Simon Su Chen, San Jose, CA (US); Jingyuan Liu, Santa Clara, CA (US); He Zhang, Santa Clara, CA (US); Brian Price, Pleasant Grove, UT (US); Calista Chandler, San Jose, CA (US)

(73) Assignee: ADOBE INC., San Jose, CA (US)

( * ) Notice: Subject to any disclaimer, the term of this patent is extended or adjusted under 35 U.S.C. 154(b) by 859 days.

(21) Appl. No.: 17/842,056

(22) Filed: Jun. 16, 2022

(65) Prior Publication Data

US 2023/0410553 A1 Dec. 21, 2023

(51) Int. Cl.
*G06T 5/92* (2024.01)
*G06V 10/56* (2022.01)
*G06V 40/16* (2022.01)

(52) U.S. Cl.
CPC .............. *G06T 5/92* (2024.01); *G06V 40/162* (2022.01); *G06V 40/172* (2022.01); *G06T 2207/10024* (2013.01)

(58) Field of Classification Search
CPC .... G06V 40/162; G06V 40/172; G06V 10/56; G06T 5/00; G06T 2207/10024; G06T 5/92
USPC ........................................................ 382/181
See application file for complete search history.

(56) References Cited

U.S. PATENT DOCUMENTS

| | | | | |
|---|---|---|---|---|
| 7,570,282 B1* | 8/2009 | Kaplinsky | .............. | H04N 17/02 |
| | | | | 382/167 |
| 8,406,482 B1* | 3/2013 | Chien | .................... | G06V 40/10 |
| | | | | 382/165 |
| 9,892,496 B2* | 2/2018 | Barron | ...................... | G06T 5/20 |
| 2008/0152228 A1* | 6/2008 | Tokuse | ...................... | G06T 5/40 |
| | | | | 382/190 |
| 2013/0077859 A1* | 3/2013 | Stauder | ................ | H04N 1/6052 |
| | | | | 382/162 |
| 2015/0302564 A1* | 10/2015 | Ho | ............................ | G06T 5/20 |
| | | | | 382/167 |

(Continued)

OTHER PUBLICATIONS

Afifi, M., and Brown, M., S., "Interactive White Balancing for Camera-Rendered Images", 28th Color and Imaging Conference Final Program and Proceedings, Society for Imaging Science and Technology, pp. 136-141 (2020).

(Continued)

*Primary Examiner* — Chineyere Wills-Burns
*Assistant Examiner* — Lucius Cameron Gree Allen
(74) *Attorney, Agent, or Firm* — Shook Hardy & Bacon L.L.P.

(57) ABSTRACT

An image processing system auto white balances an image using an object in the image and a reference color distribution. Given an input image, a target object in the input image is identified. A reference color distribution for the object type of the target object from the input image is accessed. One or more image processing settings are determined that, when applied to the input image, minimize a difference in values between pixels of the target object and the reference color distribution. A white balanced image is generated by applying the one or more image processing settings to the input image, and the white balanced image is provided for presentation.

13 Claims, 8 Drawing Sheets

(56) References Cited

U.S. PATENT DOCUMENTS

| | | | | |
|---|---|---|---|---|
| 2017/0316585 A1* | 11/2017 | Helwani | ............... | H04N 1/486 |
| 2020/0404235 A1* | 12/2020 | Moriya | ................. | H04N 23/95 |
| 2021/0160466 A1* | 5/2021 | Gera | ................... | H04N 9/3182 |
| 2021/0160470 A1* | 5/2021 | Afifi | ......................... | G06N 3/09 |
| 2021/0274102 A1* | 9/2021 | Kadoi | ....................... | G06T 7/90 |
| 2022/0076018 A1* | 3/2022 | Geiss | .................... | G06V 10/56 |
| 2022/0180572 A1* | 6/2022 | Maheshwari | ........ | G06N 3/0442 |
| 2022/0270756 A1* | 8/2022 | Yi | ....................... | G06F 18/2415 |
| 2022/0366539 A1* | 11/2022 | Lee | ........................ | G06N 3/045 |

OTHER PUBLICATIONS

Afifi, M., et al., "When Color Constancy Goes Wrong: Correcting Improperly White-Balanced Images", In CVPR, IEEE, pp. 1535-1544 (2019).

Cheng, D., et al., "Illuminant estimation for color constancy: why spatial-domain methods work and the role of the color distribution", Journal of Optical Society of America, vol. 31, No. 5, pp. 1049-1058 (2014).

Gehler, P., V., et al., "Bayesian Color Constancy Revisited", In CVPR, IEEE, pp. 1-8 (2008).

Afifi, M., and Brown, M., "Sensor-Independent Illumination Estimation for DNN Models", In BMVC, arXiv:1912.06888v1, pp. 1-13 (2019).

Afifi, M., et al., "Auto White-Balance Correction for Mixed-Illuminant Scenes", Proceedings of the IEEE/CVF Winter Conference on Applications of Computer Vision, IEEE, pp. 1210-1219 (2022).

Barron, J., T., "Convolutional Color Constancy", In ICCV, IEEE, pp. 379-387 (2015).

Cheng, D., et al., "Two Illuminant Estimation and User Correction Preference", Proceedings of the IEEE Conference on Computer Vision and Pattern Recognition, IEEE, pp. 469-477 (2016).

Hou, R., et al., "Real-Time Panoptic Segmentation from Dense Detections", In Proceedings of the IEEE/CVF Conference on Computer Vision and Pattern Recognition, IEEE, pp. 8523-8532 (2020).

Afifi, M., and Brown, M., S., "Deep White-Balance Editing", In Proceedings of the IEEE/CVF Conference on computer vision and pattern recognition, IEEE, pp. 1397-1406 (2020).

Afifi, M., et al., "Image Recoloring Based on Object Color Distributions", EuroGraphics, Short Paper, pp. 1-4 (2019).

Bianco, S., and Cusano, C., "Quasi-Unsupervised Color Constancy", In CVPR, IEEE, pp. 12212-12221 (2019).

Finlayson, G., D., and Trezzi, E., "Shades of Gray and Colour Constancy", In Twelfth Color Imaging Conference, pp. 37-41 (2004).

Wang, H., et al., "Axial-DeepLab: Stand-Alone Axial-Attention for Panoptic Segmentation", arXiv:2003.07853v2, pp. 1-26 (Aug. 6, 2020).

Afifi, M., and Brown, M., "What Else Can Fool Deep Learning? Addressing Color Constancy Errors on Deep Neural Network Performance", In ICCV, IEEE, pp. 1-10 (2019).

Afifi, M., et al., "Cross-Camera Convolutional Color Constancy", In Proceedings of the IEEE/CVF International Conference on Computer Vision, IEEE, pp. 1981-1990 (2021).

Barron, J., T., and Tsai, Y.-T., "Fast Fourier Color Constancy", In CVPR, IEEE, pp. 886-894 (2017).

Ershov, E., et al., "The Cube++ Illumination Estimation Dataset", IEEE Access, vol. 8, pp. 227511-227527 (2020).

Hu, Y., et al., "FC4: Fully Convolutional Color Constancy with Confidence-weighted Pooling", In CVPR, IEEE, pp. 1085-4094 (2017).

* cited by examiner

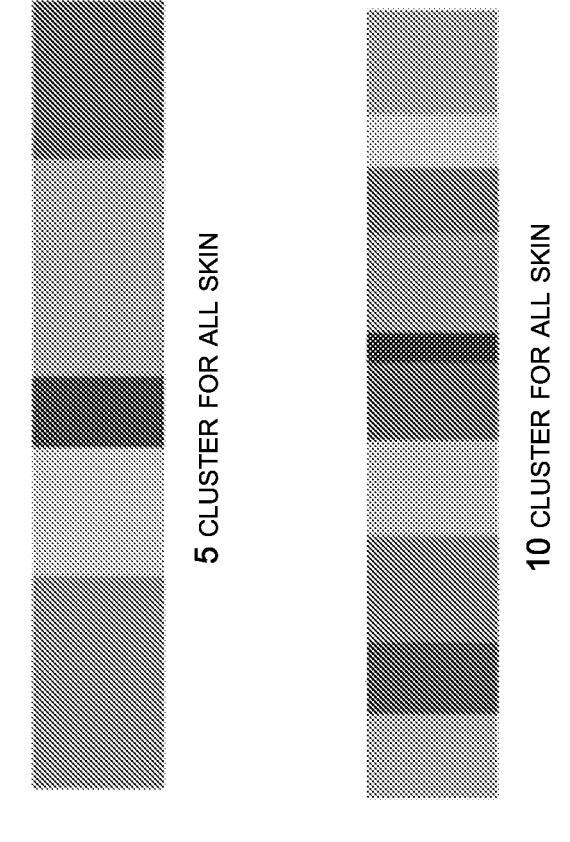
5 CLUSTER FOR ALL SKIN
10 CLUSTER FOR ALL SKIN
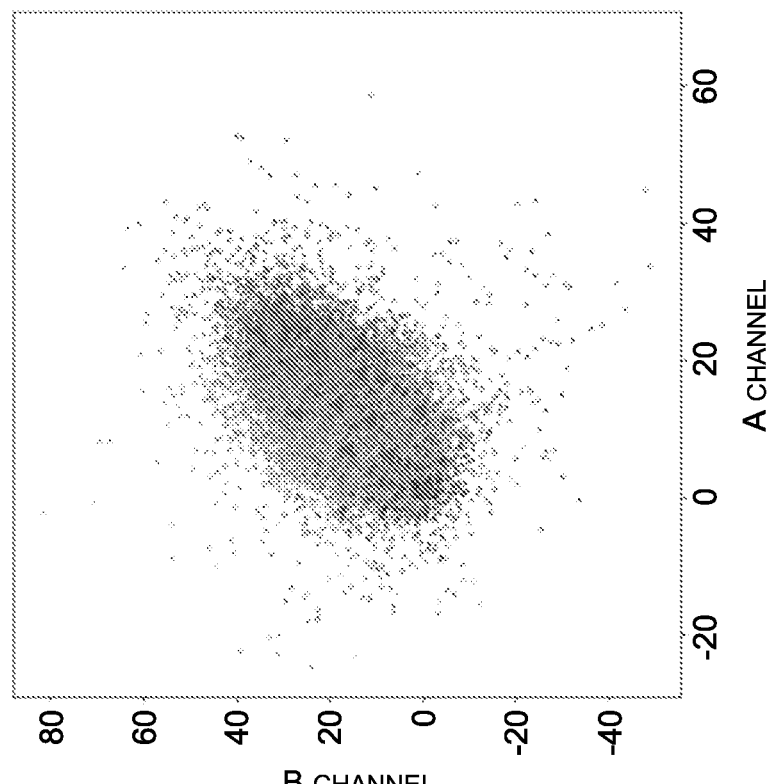
B CHANNEL
A CHANNEL
FIG. 3

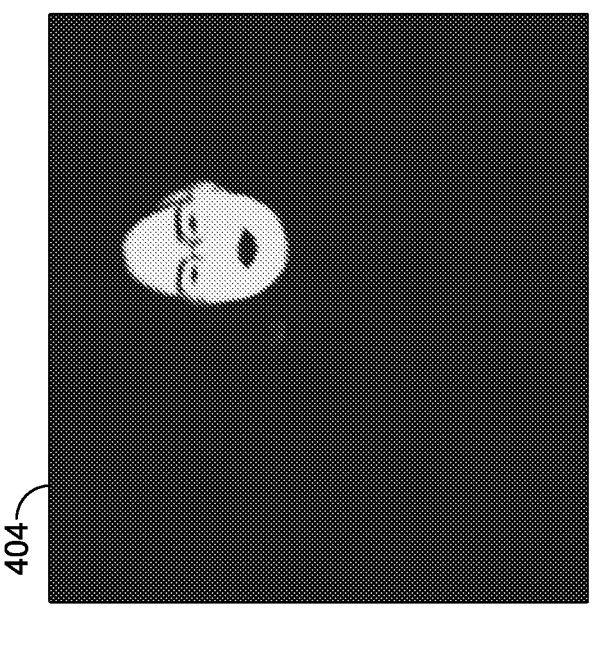
404
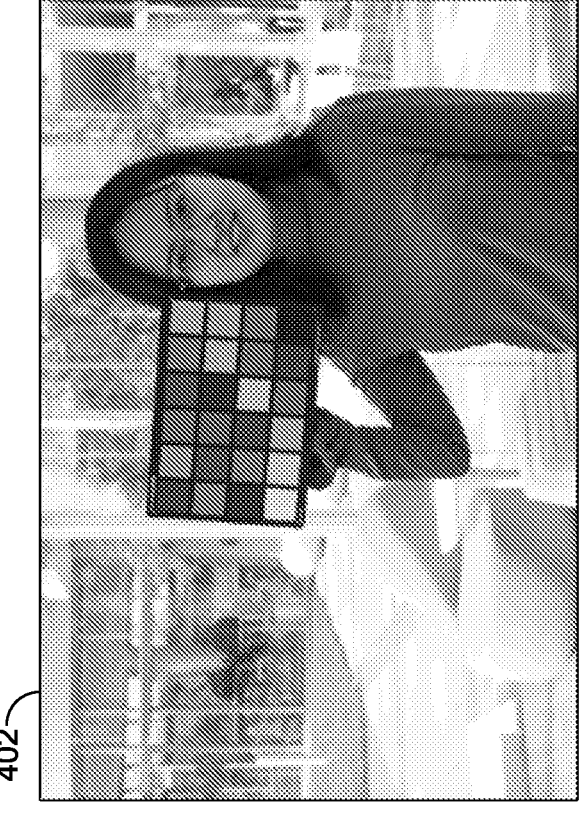
402
FIG. 4

600

602 — RECEIVE INPUT IMAGE

604 — IDENTIFY PIXELS CORRESPONDING WITH SKIN

606 — ACCESS REFERENCE SKIN COLOR DISTRIBUTION

608 — DETERMINE IMAGE PROCESSING SETTING(S) THAT MINIMIZE DIFFERENCE BETWEEN VALUES OF SKIN PIXELS AND REFERENCE COLORS

610 — GENERATE WHITE BALANCED IMAGE USING IMAGE PROCESSING SETTING(S)

612 — PROVIDE WHITE BALANCED IMAGE FOR PRESENTATION

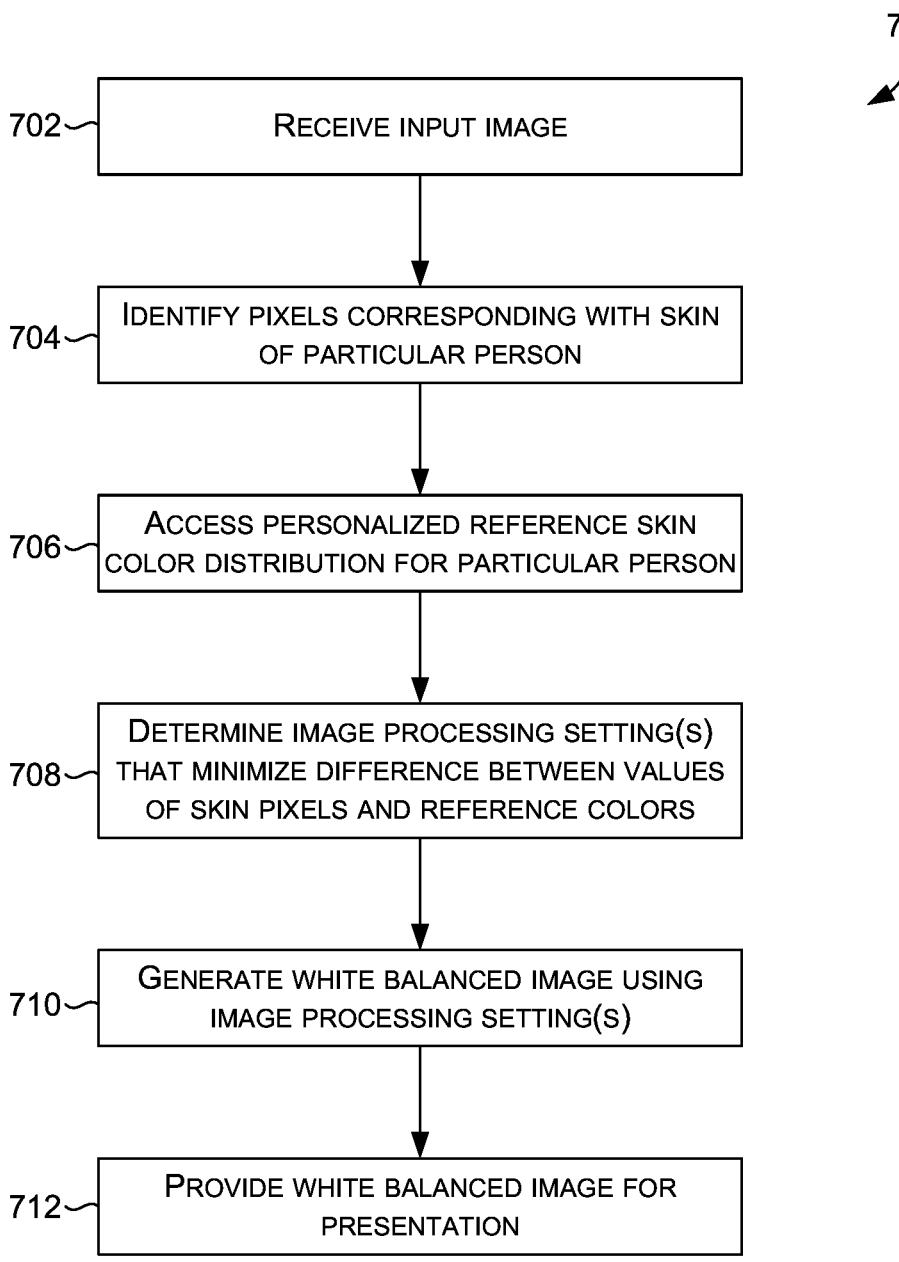

700

702 — RECEIVE INPUT IMAGE

704 — IDENTIFY PIXELS CORRESPONDING WITH SKIN OF PARTICULAR PERSON

706 — ACCESS PERSONALIZED REFERENCE SKIN COLOR DISTRIBUTION FOR PARTICULAR PERSON

708 — DETERMINE IMAGE PROCESSING SETTING(S) THAT MINIMIZE DIFFERENCE BETWEEN VALUES OF SKIN PIXELS AND REFERENCE COLORS

710 — GENERATE WHITE BALANCED IMAGE USING IMAGE PROCESSING SETTING(S)

712 — PROVIDE WHITE BALANCED IMAGE FOR PRESENTATION

FIG. 7

SEMANTIC-AWARE AUTO WHITE BALANCE

BACKGROUND

In photography and image processing, white balance is an approach for removing unrealistic color casts from camera images to ensure that scene objects that appear white to a person are rendered as white in the camera images even under different illumination conditions. White balance is usually an early step in the raw image processing pipeline, thus becoming a fundamental task in computer vision. The goal of white balance is to adjust the colors of camera images such that the colors of objects are rendered naturally, reducing the effect of the color of light sources. For instance, for portrait images of people, white balance allows for color correction to get skin tones of the people rendered correctly.

SUMMARY

Some aspects of the present technology relate to, among other things, an image processing system that auto white balances an image using an object from the image and a reference color distribution for that type of object. For instance, some configurations auto white balance an image with a person based on image pixels corresponding to the person's skin and a reference skin color distribution. When an input image is received, pixels in the input image corresponding with an object (e.g., skin, green vegetation, sky, etc.) are identified. Additionally, a reference color distribution for that type of object is accessed. For instance, a skin color distribution is accessed in the case of identifying skin pixels in the input image. One or more image processing settings are identified that when applied to the input image minimize a difference between pixels of the target object and the reference color distribution. In some aspects, the one or more image processing settings are identified using a loss function that minimizes a difference between values of pixels of a target object and a reference color distribution. A white balance image is generated by applying the selected one or more image processing settings to the input image. Some configurations provide for personalized auto white balancing for a particular person or group of people using a personalized skin color distribution generated based on images of the person or group of people.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 3 provides an example illustrating k-means clustering results on A and B channel of LAB color space in accordance with some implementations of the present disclosure;

FIG. 4 is an example illustrating an input image and a facial region identified from performing skin segmentation on an input image in accordance with some implementations of the present disclosure

FIG. 7 is a flow diagram showing a method for generating a personalized auto white balanced image from an input image in accordance with some implementations of the present disclosure.

DETAILED DESCRIPTION

Overview

Figure 1:
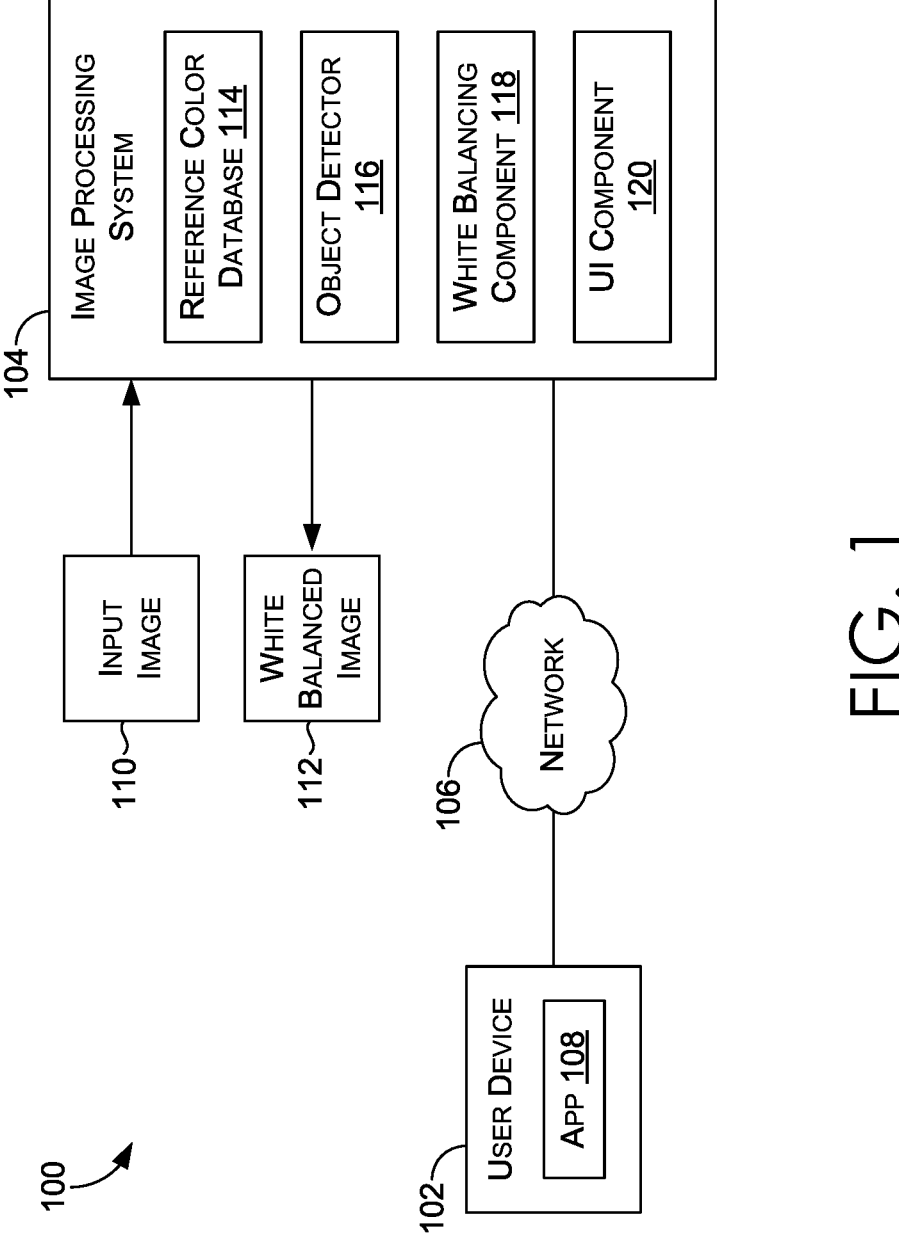
FIG. 1 is a block diagram illustrating an exemplary system in accordance with some implementations of the present disclosure.

Human vision has been conditioned through one's own personal experience (i.e., probability priors) to adapt and perceive colors of common things, such as skin, green vegetation, and sky, to be more-or-less constant irrespective of the scene's illuminant colors. However, digital cameras often have great difficulty in performing the same adaptation on the sensor's raw capture—a process known as auto white balance. Interpretation and transformation of captured image colors requires registration of neutral colors in the scene with the white point in the sensor's raw device color space.

Conventional auto white balance approaches typically require the camera's sensor response to the scene's illumination and is often an early step in in-camera processing pipelines. Once the color of the illumination is defined, a 3×3 diagonal matrix is performed for each channel to normalize the illumination. After that, other additional transforms are applied to convert the image values from a sensor-specific raw device RGB color space to an output-referred color space (e.g., standard RGB). Some approaches have also been developed for post-capture white balance editing of standard RGB images. For instance, one white balance algorithm assumes the mean of all pixels is the neutral color (gray-world model assumption). This works well on a normal scene but usually fails if the colors of the scene or illuminants are biased towards overall non-gray colors. None of these auto white balance approaches, whether as part of the in-camera processing pipeline or post capture, can handle both raw device RGB and standard RGB color space simultaneously.

Aspects of the technology described herein address these shortcomings in existing image processing technologies by providing a solution that is semantic-aware of objects in images and auto white balances the images based on the objects. Generally, an image processing system auto white balances an image using an object from the image and a reference color distribution for that type of object such that the color of the object is consistent with a typical color distribution for that type of object.

In accordance with some aspects of the technology described herein, an input image is received and analyzed to identify an object in the image. The object can be a particular type of object, such as skin, green vegetation, or sky, for which a reference color distribution is available. A reference color distribution represents a range of colors for a given object type. For instance, a reference skin color distribution includes a range of colors based on skin tones. In some instances, a reference color distribution is based on an existing standard color distribution for an object type, such as the Pantone SkinTone Guide in the case of skin. In other instances, a reference color distribution is derived from images of a particular type of object. For instance, a reference skin color distribution for skin can be generated from images of people. As another example, a reference color distribution for green vegetation can be generated from images of green vegetation.

To auto white balance the input image, pixels of the input image that correspond to the object are identified. In some instances, a probability value is determined for each pixel indicating a probability with which each pixel corresponds with the object. Given the color values of the pixels (and probability values, when used) and the reference color distribution, one or more image processing settings are determined to auto white balance the input image and generate a white balanced image, that can be output. For instance, a temperature value and/or tint value could be selected to auto white balance the image. More particularly, the process identifies one or more image processing settings that when applied to the input image minimize a difference in values for pixels of the object and the reference color distribution. For instance, in the case of skin tone, image processing settings are selected that minimize a difference between skin pixels in the image and a reference skin color distribution. In some configuration, a loss function is employed that minimizes a loss computed based on values of object pixels and a reference color distribution.

Some aspects of the present technology provide for personalized auto white balancing. A personalized reference color distribution for a person or group of people is generated based on images of that person or group of people. For instance, a user could select images of a person or the system could use facial recognition to identify images of a particular person, and those images are used to generate a personalized skin color distribution for that person. When an input image of a particular person or group of people is being processed, the personalized skin color distribution generated from images of that person or group of people is accessed and used to white balance the input image.

Aspects of the technology described herein provide a number of improvements over existing auto white balance technologies. For instance, the technology described herein can handle both raw device RGB images (scene referred raw images) and standard RGB images (output referred non-raw images). Additionally, the auto white balance approach described herein is semantic aware such that the auto white balance focuses on main objects of interest in images, thereby providing improved results. The approach can be applied to a range of object types by generating reference color distributions from reference images of objects. Further, some aspects provide for personalized auto white balance that more accurately corrects the skin tone of a particular person or group of people.

Example System for Auto White Balance

With reference now to the drawings, FIG. 1 is a block diagram illustrating an exemplary system 100 for performing auto white balance on images in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and an image processing system 104. Each of the user device 102 and image processing system 104 shown in FIG. 1 can comprise one or more computer devices, such as the computing device 800 of FIG. 8, discussed below. As shown in FIG. 1, the user device 102 and the image processing system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and server devices may be employed within the system 100 within the scope of the present technology. Each may comprise a single device or multiple devices cooperating in a distributed environment. For instance, the image processing system 104 could be provided by multiple server devices collectively providing the functionality of the image processing system 104 as described herein. Additionally, other components not shown may also be included within the network environment.

The user device 102 can be a client device on the client-side of operating environment 100, while the image processing system 104 can be on the server-side of operating environment 100. The image processing system 104 can comprise server-side software designed to work in conjunction with client-side software on the user device 102 so as to implement any combination of the features and functionalities discussed in the present disclosure. For instance, the user device 102 can include an application 108 for interacting with the image processing system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the image processing system 104 remain as separate entities. While the operating environment 100 illustrates a configuration in a networked environment with a separate user device and image processing system, it should be understood that other configurations can be employed in which components are combined. For instance, in some configurations, a user device may also provide image processing capabilities.

The user device 102 may comprise any type of computing device capable of use by a user. For example, in one aspect, the user device may be the type of computing device 800 described in relation to FIG. 8 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user may be associated with the user device 102 and may interact with the image processing system 104 via the user device 102.

At a high level, the image processing system 104 receives an input image, such as the input image 110, and applies auto white balancing to the input image to generate a white balanced image, such as the white balanced image 112. As shown in FIG. 1, the image processing system 104 includes a reference color database 114, an object detector 116, a white balancing component 118, and a user interface component 120.

The components of the image processing system 104 may be in addition to other components that provide further additional functions beyond the features described herein. The image processing system 104 can be implemented using one or more server devices, one or more platforms with corresponding application programming interfaces, cloud infrastructure, and the like. While the image processing system 104 is shown separate from the user device 102 in the configuration of FIG. 1, it should be understood that in other configurations, some or all of the functions of the image processing system 104 can be provided on the user device 102.

In one aspect, the functions performed by components of the image processing system 104 are associated with one or more applications, services, or routines. In particular, such applications, services, or routines may operate on one or more user devices, servers, may be distributed across one or more user devices and servers, or be implemented in the cloud. Moreover, in some aspects, these components of the image processing system 104 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The reference color database 114 stores one or more reference color distributions for use in auto white balancing an input image, such as the input image 110. A reference color distribution represents a range of colors for a given object type. For instance, in some aspects, a reference skin color distribution is provided that includes a range of colors based on skin tones. While some examples herein describe use of a references skin color distribution, it should be understood that reference color distributions can be provided for other types of objects, such as green vegetation or sky.

In some configurations, a reference color distribution in the reference color database 114 can be based on a standard color distribution for an object type. For instance, in the case of a reference color distribution for skin, the Pantone SkinTone Guide can be employed. The Pantone SkinTone Guide is a standard skin color distribution generated by measuring skin tones across a spectrum of skin types.

Figure 2B:
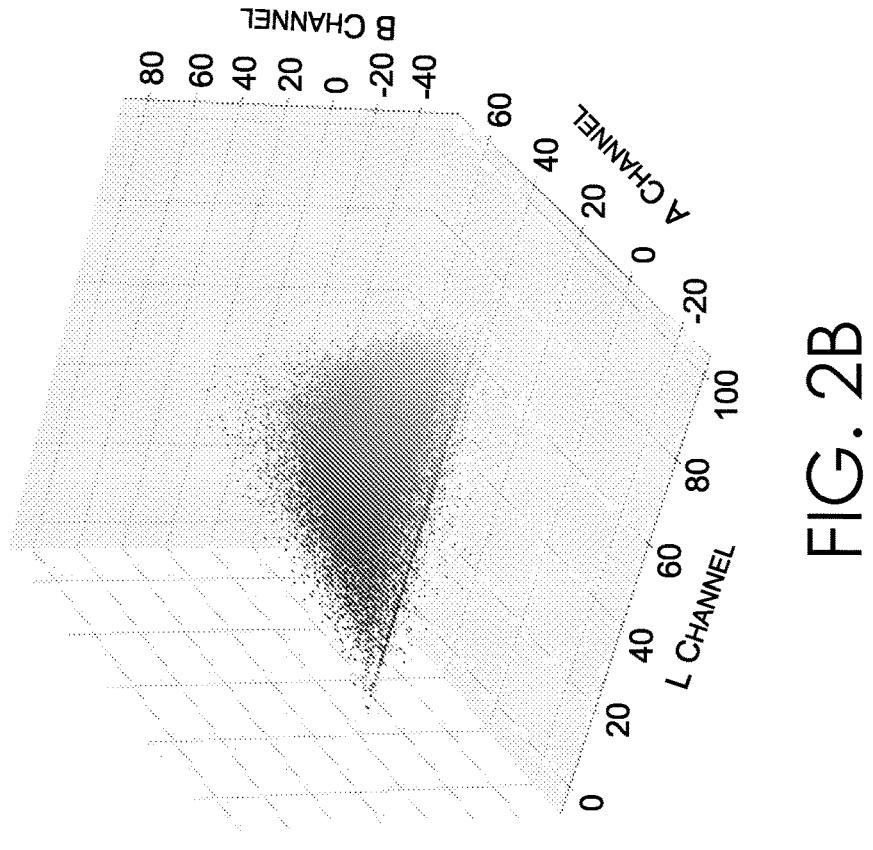
FIGS. 2A and 2B provide examples of mean skin tone 3D scatter plots in RGB and LAB color space, respectively, generated from a set of labeled images in accordance with some implementations of the present disclosure.
Figure 2A:
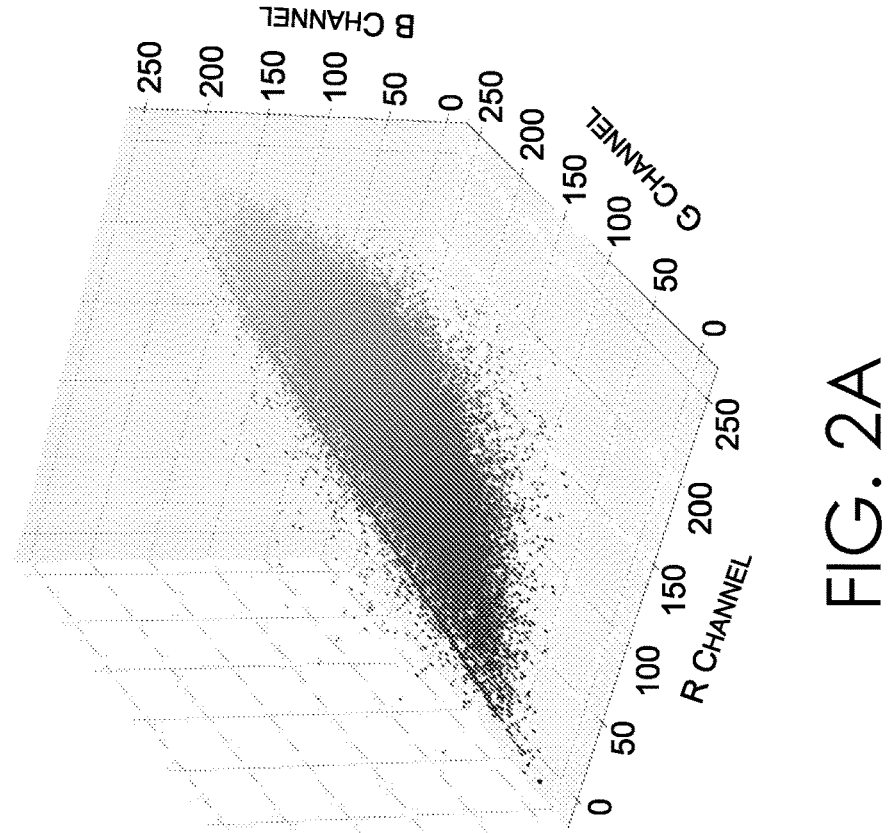

In some configurations, a reference color distribution in the reference color database 114 can be derived from images of objects of the object type. For instance, in the case of skin, a set of images with labeled skin masks could be employed to generate a reference skin color distribution. The set of images can include a variety of people with a wide range of skin tones. The process to generate a reference skin color distribution using such a labeled set of images could include, for each image, extracting pixel values (either in sRGB or LAB color space) for pixels labeled as skin and representing the image as a mean RGB value or a histogram. For instance, FIGS. 2A and 2B provide mean skin tone 3D scatter plots in RGB and LAB color space, respectively, generated from a set of 49,979 images with facial skin and body skin labeled masks. Each point denotes the mean RGB or LAB value of the skin part for each image, and the color of each point denotes the actual mean RGB color of an image. The skin color appearance can be represented as a distribution of k colors in the form of a color palette using k-means clustering. For instance, FIG. 3 illustrates k-means clustering results on A and B channel of LAB color space. Different values of k could be chosen depending on desired accuracy and performance.

In some configurations, a reference skin color database can be personalized for a particular person or group of people. Generating a personalized skin color distribution could include an approach for generating a reference skin color distribution such as that described above. However, instead of using a set of images of different people with different skin tones, a set of images for a particular person or a particular group of people can be used to generate a personalized reference skin color distribution. For instance, a user could select a set of images, and those images would be used for generating the reference skin color distribution, thereby giving the user some control over the auto white balancing of an input image.

While the examples above describe generating a reference skin color distribution and a personalized skin color distribution (i.e., using images in which the type of object is skin), it should understood that reference color distributions could be generated for any type of object using images of that type of object.

The object detector 116 of the image processing system 104 identifies an object of interest (i.e., a target object) in an input image, such as the input image 110, for use in auto white balancing the input image. In some configurations, the object detector 116 identifies an object of a certain object type. In particular, the object detector 116 can be configured to identify a certain type of object for which a reference color distribution is available such that auto white balancing can be performed based on that object type. For instance, some aspects are directed to employing skin for auto white balancing. As such, the object detector 116 can be configured to identify a portion of the image corresponding with a person in which skin is shown (e.g., a person's face). While skin is used for auto white balancing in some aspects, other types of objects can be used, such as for instance, green vegetation or sky. As such, the object detector 116 can identify other types of objects, such as green vegetation or sky.

Any of a variety of object detection methods can be employed by the object detector 116. By way of example only and not limitation, in some configurations, the object detector 116 employs salient object detection techniques to identify one or more salient objects in an input image. A salient object is an object in an image that is more likely to attract human visual attention than surrounding areas of the image. Salient object detection techniques essentially mimic the ability of the human visual system to identify salient portions of an image. The salient object detection methods can include conventional techniques and/or deep learning approaches. Additionally, object classification techniques can be employed to classify objects identified in input images as particular types of objects.

As noted above, skin is used for auto white balancing in some configurations. By way of example, FIG. 4 illustrates an input image 402 in which skin segmentation has been performed to identify a facial region 404. In some aspects, the object detector 116 applies a skin segmentation model on an input image to obtain a skin probability map that reflects a probability each pixel corresponds with skin. This can be used to build a weighted skin color histogram according to the skin probability. A skin color histogram generally represents a distribution of colors for pixels identified as corresponding with skin. For instance, the skin color histogram can indicate a number of pixels having colors within each of a number of color ranges.

In some instances, the skin segmentation model segments facial and/or body skin and assigns different weights for facial and body skin. The low resolution of an input image and the small ratio of a person on the image can influence skin segmentation. In some configurations, other than directly applying a skin segmentation model on the input image, two-pass region of interest (ROI) methods are performed to obtain a better skin probability map. For instance, in one approach, skin segmentation is applied first to get a facial mask and set a ratio according to the facial mask. In another approach, select portrait is applied first to get a person mask. In a further approach, body tracker is applied as a face detector first to get the ROI. After two-pass ROI segmentation, a weighted skin color histogram is obtained from the probability map. The weighted skin color histogram can then be employed for auto white balancing, as discussed in further detail below.

The white balancing component 118 determines one or more image processing settings to apply to an input image, such as the input image 110, to auto white balance the input image and generate a white balanced image, such as the white balanced image 112. The image processing settings can comprise any setting that impacts the white balance of an image, such as, for instance, temperature settings and tint settings. Generally, the white balancing component 118 searches the space of image processing settings to minimize a difference between pixel colors of a target object (e.g., skin, green vegetation, sky, etc.) provided by applying the image processing settings to an input image and a reference color distribution from the reference color database 116. In some configurations, the white balancing component 118 uses all pixels of a target object; while in other configurations, only a portion of the pixels of the target object are used (e.g., randomly sampled or utilizing an adaptive window).

In some configurations, the white balancing component 118 uses a loss function to identify one or more image processing settings that when applied to an input image minimize a difference between pixel colors for a target object (e.g., skin, green vegetation, sky, etc.) in the input image and a reference color distribution for that type of object from the reference color database 114. The loss function can be based on the weighted L2 distance for each pixel of a target object to the nearest reference color (e.g., a reference color swatch). In the following example loss functions, $C_j$ refers to the reference color distribution (e.g., $j=1, \ldots 110$ when using PANTONE SkinTone swatches); $x^{(i)}$ refers to the RGB or LAB value of pixel i from a target object in the input image (if in LAB space, the A and B channel value can be employed) and $p^{(i)}$ is the skin probability for pixel i.

Some approaches map pixels of a target object to different colors from a reference color distribution, and the loss function can be as follows:

$$L = \Sigma_i p^{(i)} * \min_j \|x^{(i)} - C_j\|, \text{ where } p^{(i)} > 0.5$$

Some approaches map pixels of a target object to a single color from a reference color distribution, and the loss function can be as follows:

$$L = \min_j \Sigma_i p^{(i)} * \|x^{(i)} - C_j\|, \text{ where } p^{(i)} > 0.5$$

Using the lose function, a search is performed on the image processing setting space to identify values of image processing settings that minimize the loss function. For instance, a temperature value and/or a tint value could be determined that minimizes a loss computed using values of pixels from a target object in an input image (when applying the temperature/tint values) and a reference color distribution. The process could include rendering an image given an input image and image processing settings and calculating a loss for those image processing settings using the loss function until a minimum loss value is identified. In some configurations, a grid search is used to enumerate possible image processing settings at early experiment stage. In should be understood that any of a variety of different techniques can be used to search the image processing setting space using the loss function to identify image processing settings that minimize the loss function.

The user interface component 120 enables user interaction with the image processing system 104. In some aspects, the user interface component 120 provides one or more user interfaces for presentation on the user device 102, for instance, via the application 108. In some aspects, the user interface component 120 provides user interfaces enabling a user to provide an input image for auto white balancing the input image (as well as performing other image processing tasks). In some aspects, the user interface component 120 provides user interfaces enabling a user to provide reference images of a particular type of object for generating a reference color distribution for that object type. In some further aspects, the user interface component 120 provides user interfaces that enable a user to submit photos of an particular person or group of people for generating a personalized reference skin color distribution. In still further aspects, the user interface component 120 provides user interface features that allow a user to specify how much white balance correction to apply (i.e., to what extent), such as specifying a threshold. The algorithm can then use the user input regarding the extent of white balance correction to apply when determining white balancing settings for a given image.

Example Methods for Auto White Balance

Figure 5:
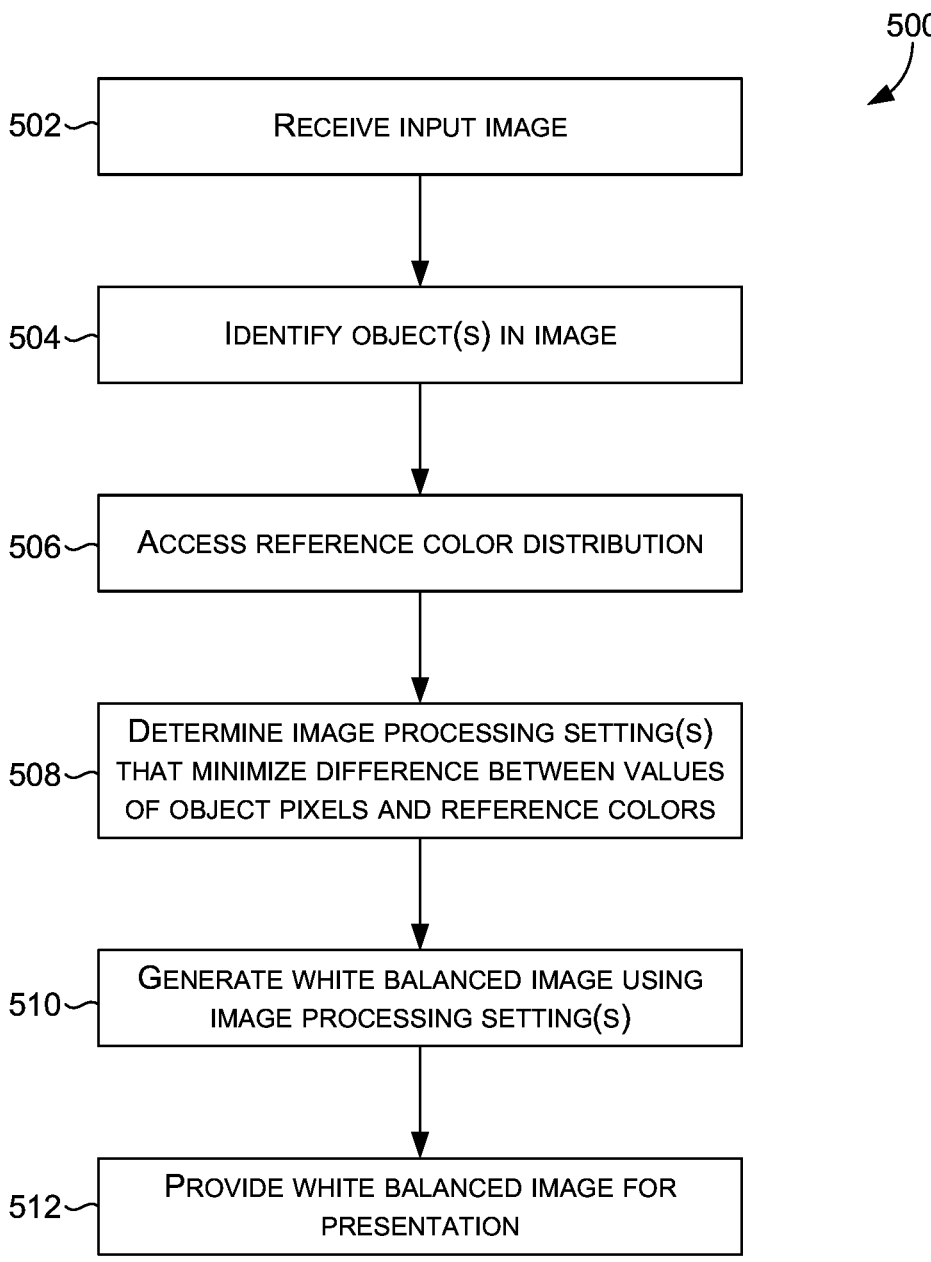
FIG. 5 is a flow diagram showing a method for auto white balancing an input image in accordance with some implementations of the present disclosure.

With reference now to FIG. 5, a flow diagram is provided that illustrates a method 500 for auto white balancing an input image. The method 500 may be performed, for instance, by the image processing system 104 of FIG. 1.

Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, an input image is received for auto white balancing. One or more objects in the input image are identified as target object(s) for use in white balancing the input image, as shown at block 504. In some aspects, an object detector identifies an object of one or more particular object types that can be used for white balancing (i.e., for which a reference color distribution is available). For instance, the object detector can be configured to identify a portion of an input image corresponding with skin, green vegetation, sky, or other object type for which a reference color distribution is available for white balancing. In some configurations, the system selects an object without any user input. In other configurations, user input is involved. For instance, when an object detector identifies multiple objects in an input image, the input image can be presented with the identified objects highlighted or otherwise visually identified as potential target objects. User input could then be received selecting one or more of the objects as target object(s) for use in white balancing. In further aspects, a probability value can be determined for each pixel in the input image indicative of probability each pixel corresponds with an object.

A reference color distribution is accessed at block 506. In some configurations, a reference color database stores multiple reference color distributions for different object types. The reference color distribution accessed at block 506 can be manually selected by the user or the system can automatically select the reference color distribution, for instance, based on the object type of the target object selected at block 504. For instance, if the target object selected at block 504 is skin, a reference skin color distribution is accessed; or if the target object selected at block 504 is green vegetation, a reference vegetation color distribution is accessed. The reference color distribution can be a standard color distribution (e.g., the Pantone SkinTone Guide), or a reference color distribution generated by processing a set of images of the object type for the reference color distribution, as described hereinabove.

As shown at block 508, one or more image processing settings are determined that, when applied to the input image, minimize a difference between values of pixels for the selected target object and reference colors from the reference color distribution. In some configurations, all pixels of the selected target object are used; while in other configurations, only a portion of the pixels are used (e.g., randomly sampled or utilizing an adaptive window). The image processing settings can comprise temperature settings, tint settings, or any other setting that adjusts a white balance of an image. In some aspects, the one or more image processing settings are determined at block 508 using a loss function. Using the lose function, a search is performed on the image processing setting space to identify values of image processing settings that minimize the loss function.

A white balanced image is generated at block 510 by applying the one or more image processing settings determined at block 508. The white balanced image is then provided for presentation to a user, as shown at block 512.

Figure 6:
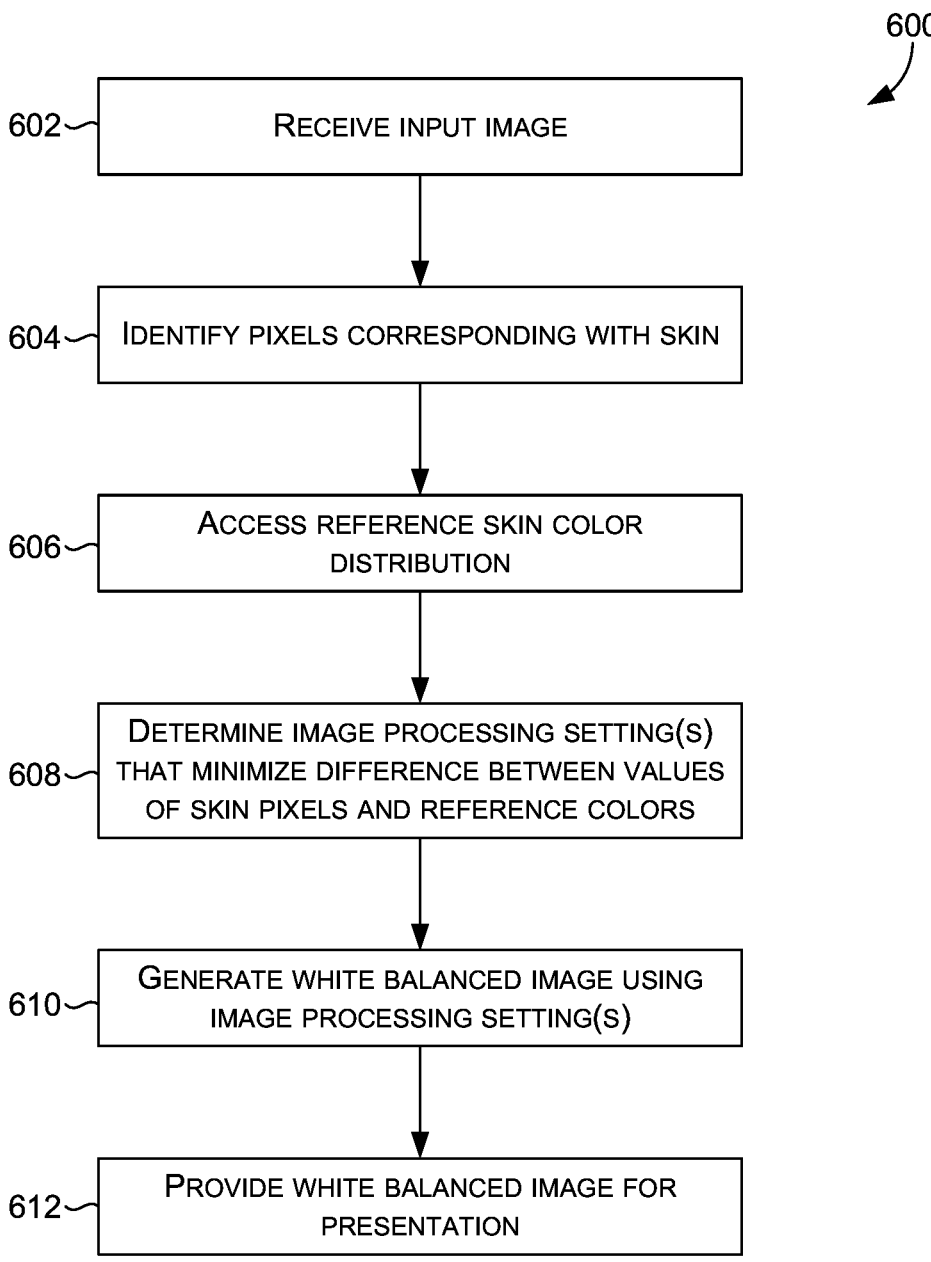
FIG. 6 is a flow diagram showing a method for auto white balancing an input image using skin in accordance with some implementations of the present disclosure.

Turning now to FIG. 6, a flow diagram is provided that illustrates a method 600 for auto white balancing an input image using skin. As shown at block 602, an input image is received for auto white balancing. Pixels in the input image corresponding with skin are identified, as shown at block 604. As discussed hereinabove, a number of different processing steps can be performed on the input image to identify pixels corresponding to skin. In some configurations, a probability is assigned to each pixel indicating a probability the pixel corresponds to skin, and a weighted skin color histogram is generated using the probabilities.

A reference skin color distribution is accessed at block 606. The reference skin color distribution can be a standard skin color distribution (e.g., the Pantone SkinTone Guide) or a reference skin color distribution generated by processing a set of images of different skin tones, as described hereinabove.

As shown at block 608, one or more image processing settings are determined that, when applied to the input image, minimize a difference between values of skin pixels and reference skin colors from the reference skin color distribution. The values of the skin pixels can be represented by a weighted skin color histogram generated from the input image. In some configurations, all identified skin pixels are used; while in other configurations, only a portion of the skin pixels are used (e.g., randomly sampled or utilizing an adaptive window). The image processing settings can comprise temperature settings, tint settings, or any other setting that adjusts a white balance of an image. In some aspects, the one or more image processing settings are determined at block 608 using a loss function. Using the lose function, a search is performed on the image processing setting space to identify values of image processing settings that minimize the loss function.

A white balanced image is generated at block 610 by applying the one or more image processing settings determined at block 608. The white balanced image is then provided for presentation to a user, as shown at block 612.

FIG. 7 provides a flow diagram showing a method 700 for generating a personalized auto white balanced image from an input image. As shown at block 702, an input image for auto white balancing is received. The input image received at block 702 includes a particular person. Skin pixels for the particular person are identified at block 704. As discussed hereinabove, a number of different processing steps can be performed on the input image to identify pixels corresponding to skin. In some configurations, a probability is assigned to each pixel indicating a probability the pixel corresponds to skin, and a weighted skin color histogram is generated using on the probabilities.

A personalized reference skin color distribution for the particular person is accessed at block 706. The personalized reference skin color distribution can be manually selected by a user and/or automatically selected (e.g., by using facial recognition to identify the person in the input image). The personalized reference skin color distribution is generated from images of the particular person. In some instance, the personalized reference skin color distribution is generated in advance and stored as part of a reference color database. In other instances, the personalized reference skin color distribution is generated during the process of auto white balancing the input image. In some cases, the personalized skin color distribution is generated from user-identified images (e.g., the user provides a collection of manually-selected images). In other cases, the images for generating the personalize skin color distribution are automatically selected by the system. For instance, the system could use facial recognition techniques to search through a database of images to identify images with the particular person. The user-provided or system-identified images of the particular person can then be used to generate the personalized skin color distribution for the particular person.

As shown at block 708, one or more image processing settings are determined that, when applied to the input image, minimize a difference between values of skin pixels for the particular person and reference skin colors from the personalized reference skin color distribution. The values of the skin pixels can be represented by a weighted skin color histogram generated from the input image. In some configurations, all identified skin pixels are used; while in other configurations, only a portion of the skin pixels are used (e.g., randomly sampled or utilizing an adaptive window). The image processing settings can comprise temperature settings, tint settings, or any other setting that adjusts a white balance of an image. In some aspects, the one or more image processing settings are determined at block 708 using a loss function. Using the lose function, a search is performed on the image processing setting space to identify values of image processing settings that minimize the loss function.

A white balanced image is generated at block 710 by applying the one or more image processing settings determined at block 708. The white balanced image is then provided for presentation to a user, as shown at block 712.

Exemplary Operating Environment

Figure 8:
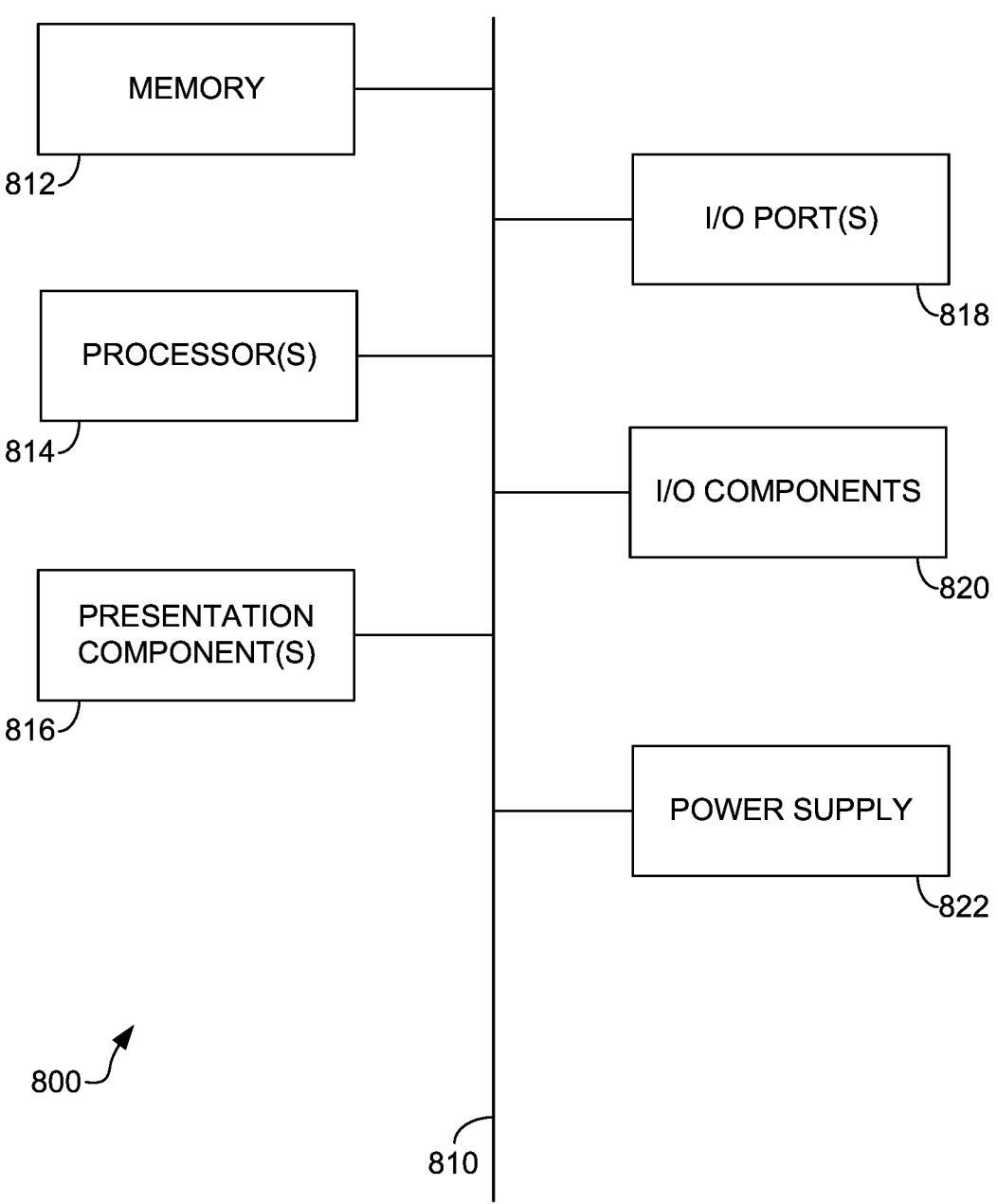
FIG. 8 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 8 in particular, an exemplary operating environment for implementing embodiments of the present technology is shown and designated generally as computing device 800. Computing device 800 is but one example of a suitable computing environment and is not intended to suggest any limitation as to the scope of use or functionality of the technology. Neither should the computing device 800 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present technology. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:

receiving an input image;

identifying pixels corresponding with an object in the input image;

identifying an object type for the object in the input image as one of a plurality of object types that each has a corresponding reference color distribution, the plurality of object types including one or more skin object types and one or more other object types that each has a corresponding reference color distribution;

selecting, from a plurality of reference color distributions for the plurality of object types, a reference color distribution based on the identified object type, the selected reference color distribution generated from a plurality of reference images of objects of the identified object type;

determining one or more image processing settings by iteratively adjusting the image processing settings using a loss function that weights each pixel according to a probability that the pixel corresponds to the object and minimizes a difference between the selected reference color distribution and values of the pixels corresponding with the object when applying the one or more image processing settings to the input image, wherein the one or more image processing settings comprise one or more adjustable image settings of an image processing application applied to the input image that impact white balance; and generating a white balanced image by applying the one or more image processing settings to the input image, wherein the one or more image processing settings are applied to the entire input image.

2. The computer storage media of claim 1, wherein the object comprises a person, the pixels corresponding with the object comprise pixels identified as corresponding with skin of the person, and the reference color distribution comprises a reference skin color distribution.

3. The computer storage media of claim 1, wherein the object is identified as a particular person and the reference color distribution is selected from the plurality of reference color distributions based on the particular person identified in the input image.

4. The computer storage media of claim 3, wherein the reference color distribution comprises a personalized skin color distribution generated from images of the particular person.

5. The computer storage media of claim 1, wherein the loss function uses all pixels identified as corresponding with the object in the input image.

6. The computer storage media of claim 1, wherein the one or more image processing settings comprise at least one selected from the following: a tint value, and a temperature value.

7. The computer storage media of claim 1, wherein the operations further comprise:

receiving input indicative of a user selection of the object from the input image.

8. A computerized method comprising:

receiving an input image;

identifying pixels corresponding with an object in the input image;

identifying an object type for the object in the input image as one of a plurality of object types that each has a corresponding reference color distribution, the plurality of object types including one or more skin object types and one or more other object types that each has a corresponding reference color distribution;

selecting, from a plurality of reference color distributions for the plurality of object types, a reference color distribution based on the identified object type, the selected reference color distribution generated from a plurality of reference images of objects of the identified object type;

determining one or more image processing settings by iteratively adjusting the image processing settings using a loss function that weights each pixel according to a probability that the pixel corresponds to the object and minimizes a difference between the selected reference color distribution and values of the pixels corresponding with the object when applying the one or more image processing settings to the input image, wherein the one or more image processing settings comprise one or more adjustable image settings of an image processing application applied to the input image that impact white balance; and generating a white balanced image by applying the one or more image processing settings to the input image, wherein the one or more image processing settings are applied to the entire input image.

9. The computerized method of claim 8, wherein the object is identified as a particular person; and the reference color distribution is selected from the plurality of reference color distributions based on the particular person identified in the input image.

10. The computerized method of claim 8, wherein the reference color distribution comprises a personalized skin color distribution generated from images of a particular person.

11. The computerized method of claim 8, wherein the one or more image processing settings comprise at least one selected from the following: a tint value, and a temperature value.

12. A computer system comprising:

a processor; and a computer storage medium storing computer-useable instructions that, when used by the processor, causes the computer system to perform operations comprising:

receiving an input image;

identifying pixels corresponding an object in the input image;

identifying an object type for the object in the input image as one of a plurality of object types that each has a corresponding reference color distribution, the plurality of object types including one or more skin object types and one or more other object types that each has a corresponding reference color distribution;

selecting, from a plurality of reference color distributions for the plurality of object types, a reference color distribution based on the identified object type, the selected reference color distribution generated from a plurality of reference images of objects of the identified object type;

determining one or more image processing settings by iteratively adjusting the image processing settings using a loss function that weights each pixel according to a probability that the pixel corresponds to the object and minimizes a difference between the selected reference color distribution and values of the pixels corresponding with object when applying the one or more image processing settings to the input image, wherein the one or more image processing settings comprise one or more adjustable image settings of an image processing application applied to the input image that impact white balance; and generating a white balanced image by applying the one or more image processing settings to the input image, wherein the one or more image processing settings are applied to the entire input image.

13. The computer system of claim 12, wherein the one or more image processing settings comprise at least one selected from the following: a tint value, and a temperature value.

* * * * *